July 17, 1956 C. R. LEMONS 2,755,216
PROCESS FOR FORMING A MULTI-DUCTED SHELL
Filed Aug. 16, 1952 3 Sheets-Sheet 1

INVENTOR.
CARL R. LEMONS
BY
Edwin Coates
ATTORNEY

July 17, 1956     C. R. LEMONS     2,755,216
PROCESS FOR FORMING A MULTI-DUCTED SHELL
Filed Aug. 16, 1952     3 Sheets-Sheet 2

INVENTOR.
CARL R. LEMONS
BY
ATTORNEY

July 17, 1956
C. R. LEMONS
2,755,216
PROCESS FOR FORMING A MULTI-DUCTED SHELL
Filed Aug. 16, 1952
3 Sheets-Sheet 3
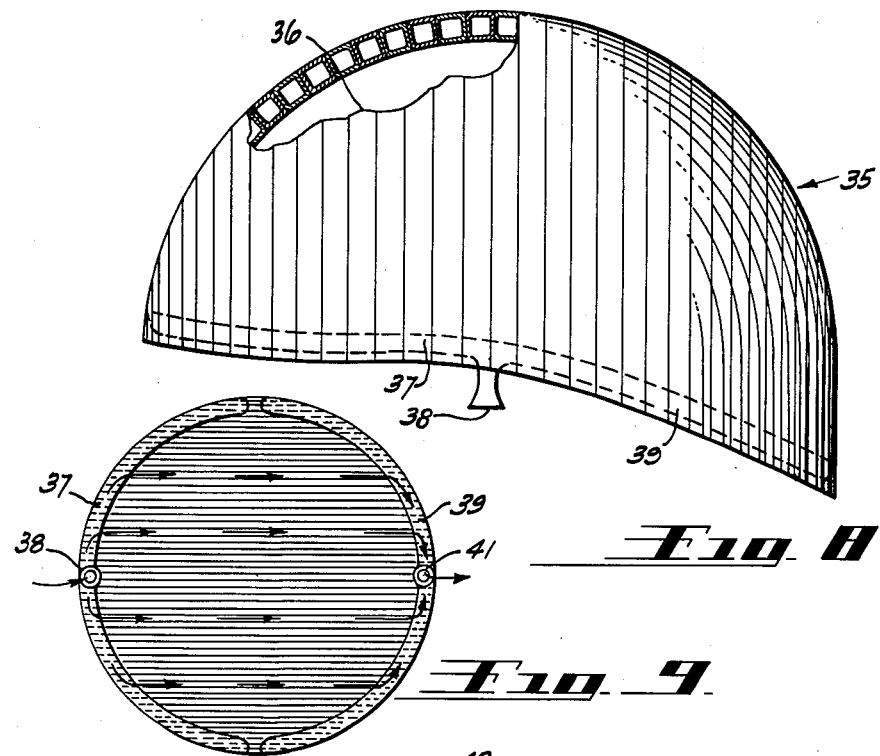
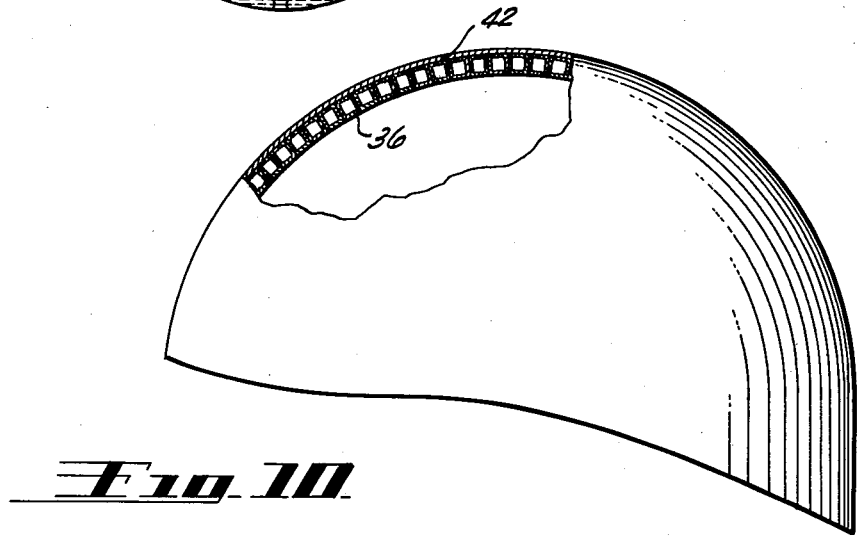
INVENTOR.
CARL R. LEMONS
BY
-ATTORNEY- United States Patent Office 2,755,216
Patented July 17, 1956

2,755,216

PROCESS FOR FORMING A MULTI-DUCTED SHELL

Carl R. Lemons, Encino, Calif., assignor to Douglas Aircraft Company, Inc., Santa Monica, Calif.

Application August 16, 1952, Serial No. 304,689

4 Claims. (Cl. 154—110)

This invention relates to enclosures for aircraft equipment, and particularly concerns enclosures for radiant electrical energy transmitting and receiving apparatus such as radar equipment, commonly referred to as radomes.

Such enclosures are often exposed to weather or altitude conditions which lead to icing of the exterior surface of the enclosure. If the exterior coating on the enclosure becomes thick enough, it will either entirely insulate the enclosed electrical apparatus from other such stations or seriously diminish its operating efficiency. It is also possible that the ice coating may, by sufficiently altering the contour of the enclosure and increasing the weight of the airplane, noticeably impair the performance or aerodynamic efficiency of the craft.

As one solution of this problem, certain kinds of heated radomes have been proposed. The heating means of these heated radomes are employed to either de-ice the exterior surface of the enclosure after an ice-coating has formed thereon, or to prevent ice forming thereon by maintaining it heated. Neither type has heretofore been capable of being brought to the desired thermal or electrical efficiency, principally because the lack of a suitable and efficient method and means for fabricating the radome has heretofore restricted the materials and configurations employable in currently known modes of fabrication to those which possess rather low powers of passing radiant electrical energy therethrough. For example, many radomes have heretofore been constructed of honeycomb core panels or sponge rubber core panels, neither of which cores are, for one thing, capable of distributing the heat parallel to the faces of the shell and hence cannot provide effective ice-repellent for the shell.

By means of an improved method and means of fabrication of substantially hollow walls or enclosures having a self-contained duct-system extending therein parallel to the surfaces thereof, the present invention provides a radome which can be entirely constructed of such better transmitters of radiant electrical energy as "Fibreglas," or other glass cloth sheet material impregnated with a thermosetting resin or other suitable impregnant capable of rendering the sheet-material easily formable while wet and almost as easily curable in situ in the mold into a rigid final shape. By virtue of the self-contained duct system for the heating medium, a relatively low-powered heat source may be employed to heat a relatively large enclosure to an ice-repelling degree. Because of the lower impedance afforded to radiant electrical energy waves by the reticulate laminate of glasscloth material, a lower powered radar, or other radiant electrical energy transmitting set than heretofore employable in such weather-exposed enclosures may be utilized for the same ranges and duties as heretofore required a much higher powered set.

In one of the many constructional embodiments contemplated by the invention, the radome takes the form of a "veined," or multi-ducted, "hollow-walled" laminate, the laminate being contoured aerodynamically as a shell about the radar, or other, apparatus and attached securely or tightly at its edges to the adjacent exterior portion of the airplane. The ducts are flow-connected to a source of pressurized heating medium, such as the airstream heated in an engine-exhaust heat-exchanger or in an internal combustion heater.

Structurally more specifically considered, the presently preferred form of the article essentially comprises opposed, transversely separated hardened-resin impregnated, glasscloth surfaces consisting of a plurality of facing sheets and a plurality of mutually laterally spaced glasscloth septums, these septums being interposed substantially transversely between the surfacing sheets in edgewise attitude and united edgewise to the surfacing sheets, so as to define a plurality of ducts extending substantially parallel to the faces of the enclosure, either transversely of the major dimension of the enclosure or parallel thereto and adapted for the passage therethrough of a suitable heating medium for inhibiting ice-caused diminution of the electrical or aerodynamic efficiency of the radome.

The essential steps of the method, which enable the fabrication of the improved heated radomes and the like from such improved paraelectric materials as glasscloth are susceptible of sufficiently rapid performance with such a relatively small number of pieces of apparatus as to render the large-scale, quantity production of the improved type of heated radome quite feasible.

Briefly stated, the improved method of the present invention comprises, essentially, a series of steps commencing with taking a plurality of substantially rigid, preferably elongate members, each composed of a material having a relatively low melting point, such as a suitable wax composition, each of these members being provided with an envelope that covers all its surface except the two opposite ends thereof. This envelope consists of a material having good powers of transmission of heat and radiant electrical energy, and in its most prevalent form consists of a glasscloth sheet-material impregnated with a thermosetting resin. The so-constituted units are arranged in mutual lengthwise parallelism and in mutually coextensive lateral contact. A matrix, for example, a female mold, having an upwardly disposed, or otherwise accessibly arranged, concave molding face defining the contours of the desired final article, is then employed to support this assembly of units arranged longitudinally in facewise contact with this concavity.

Since in its simplest form the radome may consist merely of a plurality of hollow, self-curing tubular members that are laterally mutually united by this curing into a ducted, sheet-like article, the next step of the process may simply consist in allowing or enabling the above-mentioned supported assembly of units to cure together into integrality in the concavity of the mold. This step results in a solid-interior laminated article in which the ducts are filled with the aforestated wax.

The final step in fabricating this, the simplest, article contemplated by the invention, consists in heating the unit produced by the aforestated steps at a sufficiently high temperature, and for a sufficient length of time, to melt out the wax composition from the tubular units. The melted wax flows out the opposite, open ends of the tubular members.

The multi-ducted, hollow-walled article produced by these steps may, in a ramification of the method, have one or both, of its major surfaces faced off with a glass-cloth sheet impregnated with a hardening resin so as to provide a receptacle having a hollow-laminated wall. To this end, a resin-impregnated glasscloth sheet is interposed between the aforedescribed assembly of tubular units and the face of the mold before proceeding with the curing step and the melting-out step. A similar sheet may, if desired, be added to the opposite surface of the tubular assembly before curing. The laminated article thus comprises at least one facing layer of glasscloth integrating a plurality of longitudinally extending glasscloth ducts, the article of course conforming longitudinally and laterally to the corresponding shape of the matrix.

In its simplest essentials, the apparatus for use in forming any of the aforementioned types of ducted articles comprises a matrix, or female mold member, adapted to receive in facewise contact with its concavity a plurality of the aforesaid type of tubular, wax-filled units with the units arranged in longitudinal mutual parallelism and in mutual lateral contact; means associatable with the matrix for enabling, or positively effecting, curing together of the contacting envelopes of these units; and means associatable with the matrix for heating the integer produced by the aforesaid steps sufficiently to melt out the cores from said members and produce a ducted sheet-like article.

Several of the articles contemplated by this invention, together with a number of apparatuses or instrumentalities employable in accordance with the present methods to produce these articles, are illustrated in the accompanying drawings and described hereinafter in detail in conjunction with these drawings. In these drawings, Figure 1 is a somewhat diagrammatic fragmentary side-elevational view of an airplane incorporating one of the present radomes at its nose;

Figure 8 is a side elevational view of a complete radome fabricated according to the process and apparatus of Figure 2, and comprising merely a plurality of laterally integrated ducts;

Figure 9 is a rear elevation of the radome of Figure 8 taken to show the entry, flow path, and exits of the heating-fluid, usually heated air, and Figure 10 is a side elevational view of a complete radome fabricated according to the proces of Figure 3 and comprising a plurality of laterally integrated tubes faced off on one face with a resin-impregnated glasscloth sheet.

Figure 1:
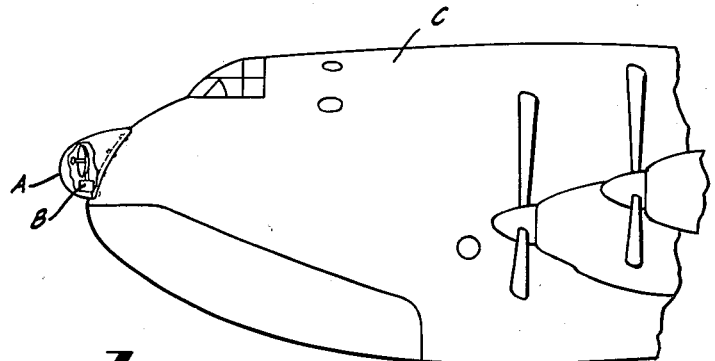

The type of article for which the present processes and apparatuses are especially adapted, but not limited, is shown at A in Figure 1 as a nose-mounted radome, or radar enclosure for encasing the radar receiving and transmitting apparatus B mounted therein, the two being carried by flanged-union to the framing of the nose-portion of an airplane C.

Figures 2, 3:
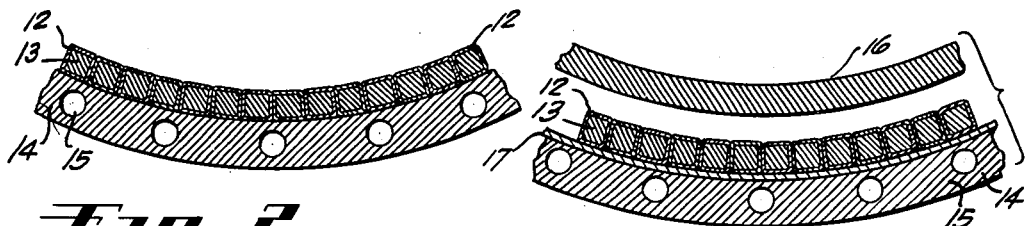
Figure 2 is a diagrammatic fragmentary transverse section of the simplest form of mold employed for fabricating the simplest form of the present radome wall, which latter consists solely of a plurality of self-curing tubes integrated into a hollow sheet-like shell conformed to the shape of the matrix.
Figure 3 is a similar view of a radome wall being fabricated in a matrix, the wall being composed of glasscloth tubes faced off on the one major face with a sheet of resin-impregnated glasscloth.

In fabricating the simplest form of radome wall contemplated by the invention, namely, the form shown in Figures 2 and 8, elongate units each composed of a self-curing film 12 formed to envelop a meltable core 13 are arranged in mutual longitudinal parallelism and in mutual lateral contact, in transversely extending, facewise contact with a simple female mold 14.

The film 12 may be formed by spirally winding a strip of self-curing material, such as glasscloth with a suitable self-curing impregnant, on the core or the core may be "dipped" in a plastic self-curing substance, or the external coating 12 may be otherwise formed on the core. In any event, in this species of the invention, the layer 12 is composed of a self-curing material such as a polyester, or an alkyd-type resin, with any suitable peroxide catalytic system. This material possesses good thermal and electrical properties and strips of it are also capable of being heat cured together, or into integrality, so as to form a transversely ducted, shell-like article.

The cores are composed, preferably, of a wax-composition that has a high melting point, as of the order of 180°–225° F. One suitable such composition consists of a mixture of paraffin, 2 parts, with beeswax, 1 part.

The opposite ends of the elongate units formed by members 12 and 13 are left open sufficiently to allow the melted wax to flow thereout, or, if desired, a hole may be drilled in each end of the units for this purpose. A hold-down ring, not shown, is then clamped against the periphery of the mold in order to hold the units against slippage.

Polyesters, or alkyd type resins, of the type employed in this invention with a suitable peroxide catalyst have the capability of curing themselves if allowed to "stand" at room temperature and pressure and the next step of this method comprises enabling such curing to occur. This step may involve merely allowing the closely contacting tubular units to stand under suitable temperatures and pressures—usually of the order of 110° F. to 120° F. for a period of time of the order of 16 hours at the end of which step the laterally contacting portions of the tubular member are in a mutually integrated condition.

The final step in producing the simplest radome contemplated by the invention consists in a so-called "lost-wax" step in which the cores are removed from the assembly by heat-flowing them out of the united units. To this end, the matrix 14 is originally fabricated, preferably, with fluid-conducting channels 15 through which can be passed a heated medium, not shown, from a source not shown. All that is required of this medium is that it be capable of containing heat and transferring it to the units sufficiently to raise the temperature of the cores to a degree of the order of 180° F. to 225° F. At this temperature, the wax-composition cores melt and flow out each end of each unit.

A parting layer, not shown, but of suitable material, such as a talc, may of cource be employed between the lower faces of the tubular members and the adjacent face of the matrix, so that the transversely ducted integral, hollow sheet-like article resultant from the aforestated operations may be readily removed from the matrix.

Instead of employing a steam heated matrix, the latter may be so heated as to melt out the wax in a conventional plastics curing oven; or, if desired, the matrix may be suitably immersed in hot water for this purpose.

The apparatus shown somewhat diagrammatically in Figure 3 is essentially the same as that shown in Figure 2 and is employed to fabricate a ducted article consisting of a plurality of the aforedescribed tubular elements 12 composed of Fibreglas cloth, resin-impregnated, and facewise united on the one of the major faces of the tubular assembly to a sheet 17 of resin-impregnated Fibreglas cloth.

In this instance, however, since the materials are not self-curing and do not automatically conform precisely to the contours of the matrix, it may be advisable to employ a complementary-shaped co-acting male mold member 16 to assure the formation of the ducted article into the proper contours. The male mold 16 may be faced off, if necessary, on its convex, or inner, face with a suitable parting layer, such as a talc coating, with or without a cellophane facing sheet thereon adjacent the ducted article.

Curing can be expedited and facilitated by providing the male mold member with heating fluid passages, if desired, similar to those designated 15.

The operation of the mold halves is substantially the same as that usually employed in split-half press-molds and needs no further elucidation, except that the heating fluid temperature for the curing step is maintained lower than that at which the wax composition begins to soften, and thus is of the order of 120° F. This temperature is employed for a period of the order of 16 hours.

In the melting-out step, the temperature of the heating medium is raised to the order of 180° to 225° F. and maintained until the wax has completely emptied out of the tubular members.

Figure 4:
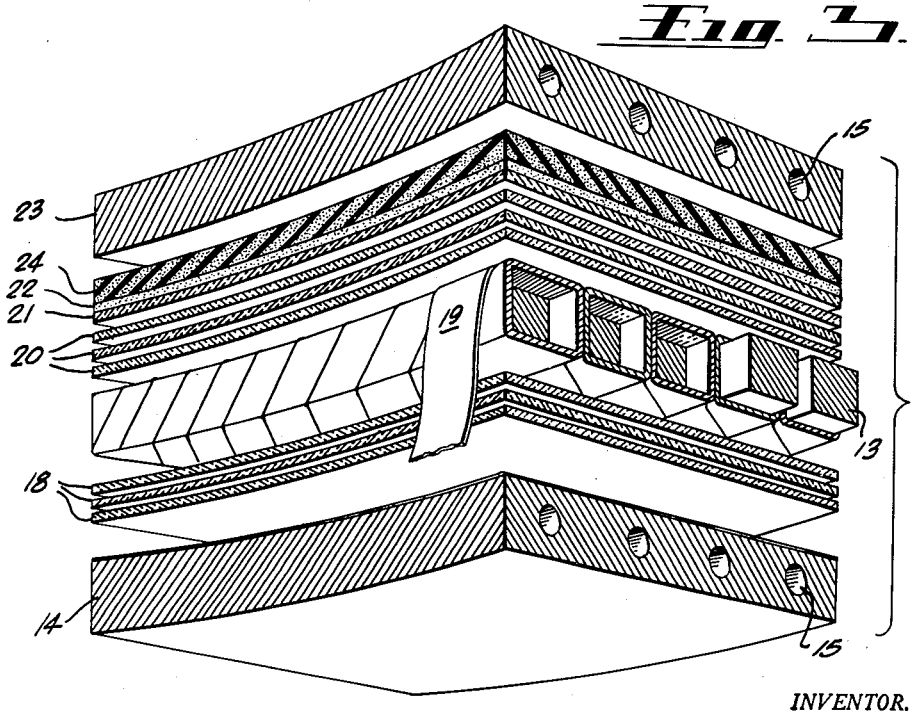
Figure 4 is a diagrammatic fragmentary perspective view, partly in section, of an apparatus containing materials employed in fabricating a portion of the longitudinally-ducted radome wall consisting of spirally-wound heating medium tubes faced off oppositely with glasscloth laminates.

In Figure 4, apparatus is provided for fabricating a transversely ducted sheet-or-shell like article which is faced off on both major faces with one or more sheets of glasscloth. The apparatus is generally similar to that of Figure 3, as are the materials employed in fabricating the article. The method, as in the previous species, employs the "lost wax" process.

A female mold 14 having, preferably, a surface layer of parting lacquer is employed as a matrix or pattern in which the structure to form the wall of the radome is fabricated. In one mode of procedure, three resin-impregnated glass cloth layers 18 are smoothed against the coated mold surface. Elongate strips 13 of the above described wax composition are, next, spirally wrapped with the desired number of layers of resin-impregnated glass cloth 19. A suitable type of such resin is the well-known Selectron, 5016, a product of Pittsburgh Plate Glass Co., Pittsburgh, Pennsylvania. This, as is well known, is a trade-secret product which has defied exact analysis, but which is known to be a mixture of polymers of maleic and phthalic anhydrides reacted with such alcohols as propylene glycol. The cloth-wrapped strips are positioned together in the mold 14 and each is firmly nested against the adjacent strip. If found desirable, though not essential, several reinforcing plies of resin-impregnated glass cloth may be placed under and over the ends of the wax around the rim of the mold in order to strengthen the attachment rim of the radome.

The inner "skin" of the radome is next formed by smoothing three more resin impregnated layers of glass cloth 20 into position on top of the cloth-wrapped wax strips. A layer of cellophane 21 is then placed upon the upper glass cloth layer in order to insulate the wet glasscloth from a sponge rubber coating 24 on the male mold 23. A talc layer 22 may also be interposed between the surface of the sponge rubber 24 and the cellophane in order to serve as a parting layer between the rubber and the cellophane. A hold down ring, not shown, may then be clamped against the rim of the female mold in order to retain the glass cloth layers against slippage when the pressure of the male mold is applied.

The male mold is then pressed into the female mold by the use of several C-clamps, not shown, and the impregnated glass cloth is then cured for several hours at a temperature below that at which the wax loses its rigidity, say, of the order of 110° F. The wax may be a composition as described above. The curing can be done by the heating conduits 15 or by immersing the mold in a hot bath or baking in an oven.

After the glasscloth is cured, exit apertures for melted wax are drilled in the opposite ends of each wax-filled duct. Thereafter, a heated medium is circulated through the passages 15 until the temperature of the wax-filled tubular members reaches that of the melting-point of the wax composition, say of the order of 180° F. to 225° F. This temperature is maintained until all the fillers are flowed out of the ducts.

Figure 5:
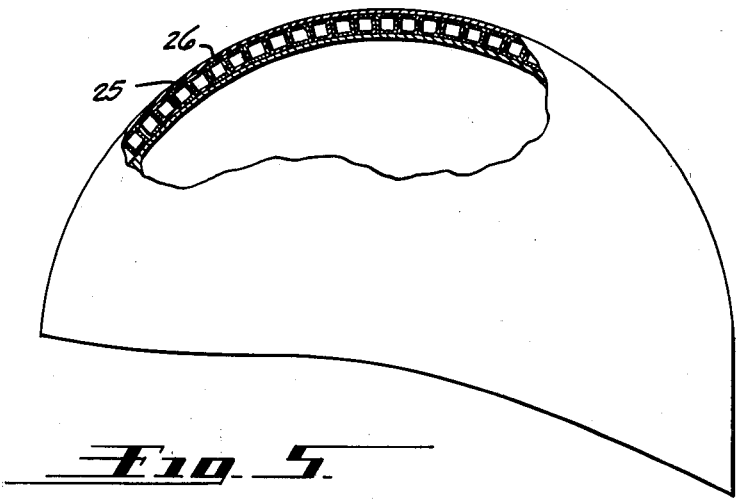
Figure 5 is a side elevational view, partly broken away, of a complete radome as fabricated by the apparatus of Figure 4.

In Figure 5 there is shown that species of the present radome which consists of a plurality of hollow glasscloth tubes, or heating ducts 25 arranged, like those being fabricated in Figures 2 and 3, in substantial parallelism with the compound curved surface contour of the radome, the tubes being disposed in mutually contacting parallelism throughout their lengths and mutually laterally united to form an integer.

To each of the opposite major faces of this integer is united a glasscloth sheet 26, each sheet being compound-curved of course into the same shape of warped surface as that of the tubes-integer. Although limited by its double-faced nature to fabrication in an apparatus which must be essentially like that of Figure 4 and despite the fact that it naturally has a greater total weight than those made by the apparatus of Figures 2 and 3, the article of Figure 5 is of considerable rigidity and durability and constitutes the presently preferred embodiments of the invention. It is attached to the nose of the airplane in the manner, and by the means, already described in connection with Figure 1 and serves the same purposes.

Figure 6:
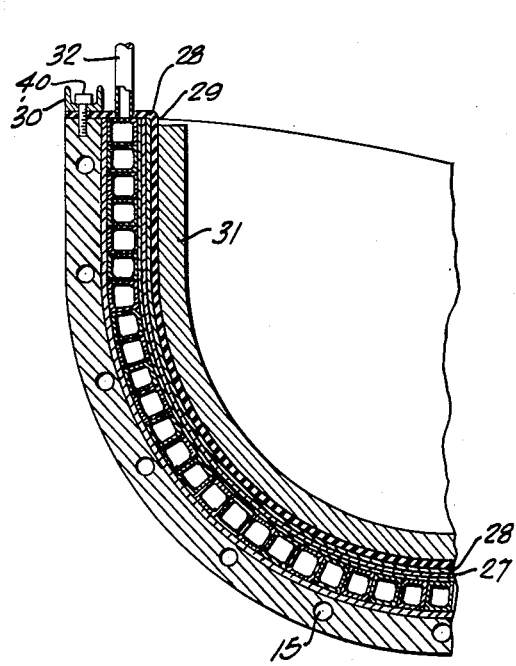
Figure 6 is a fragmentary, rather diagrammatic transverse section of an apparatus for fabricating the radome of Figure 5 by means employing the vacuum bag principle in the forming-step.

In Figure 6 there is shown still another form of apparatus for fabricating the heated radom, or ducted shell by the present novel method. The parts of the radome are assembled in the manner and positions as previously recited. On the exposed, or concave, face of the assembly of glasscloth material a cellophane parting-layer 27 is disposed and outwardly faced with a breather, or "bleeder," layer 28. The latter layer is preferably composed of a glasscloth untreated with resin or other impregnant, as it is not desired to harden it or to cure it into union with any other component. A vacuum bag is then constructed over and around the single-member matrix by means of a flexible sheet 29 of some such material as polyvinyl chloride. This sheet is arranged in close facewise contact with the outer, or exposed surface of the breather layer 28 and is sealed at its peripheral margin to the rim of the female mold. The sealant preferably consists of one of the suitable, well-known chromate sealing compounds disposed peripherally of the mold at the junction of the sheet 29 and the inner face of the mold. The marginal extension of the sheet 29 is preferably clamped to the adjacent edge-surface of the periphery of the mold, as by the annular channel member 30 suitable fasteners 40 being also provided.

The sealed bag is preferably covered on its outer, or concave, face with a Fibreglas insulating pad 31. This pad is employed only when heat is applied to the underside of the female mold, as by means of the hot medium conducting pipes 15, the pad then serving to prevent loss of any appreciable amount of heat from the concave surface of the polyvinyl chloride sheet.

Forming-pressure is applied to the assembly of glasscloth sheets and tubular members by evacuating the space sealed off by the sheet 29, this end being accomplished by a vacuum pump (not shown) operatively connected to a suction conduit 32. Preferably concurrently with this step, the glasscloth components of the article are cured together by passing a heated medium through conduits 15 and maintaining the temperature of the system at a temperature of the order of 110° F.–120° F. for about 16 hours. If found desirable, however the curing step may be performed by placing the mold in a suitably heated oven or in a "hot-water bath" apparatus of a suitable temperature while of course, maintaining the operating connection between the bag and the vacuum pump.

The temperature of the system is then elevated to a degree sufficient to effect melting and flowing of the wax composition filling the tubular elements. This temperature, which is of the order of 180°–225° F., is maintained for a time period of the order of 2 to 5 hours, or until substantially all the wax has been flowed out of the tubular elements.

The resultant transversely ducted hollow sheet-like article is then removed from the mold ready for use as a radome or other heated, ice-repellent enclosure member.

Figure 7:
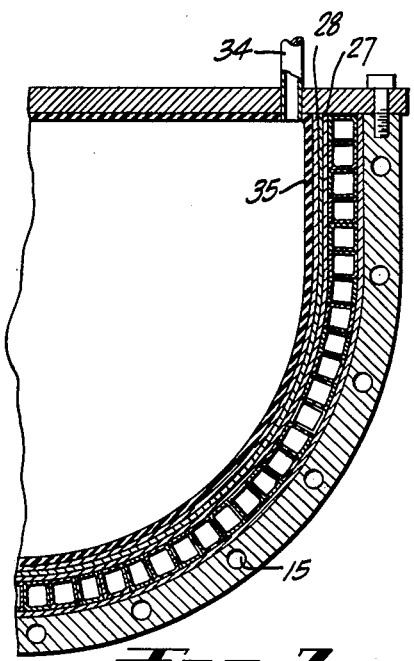
Figure 7 is a similar view of an apparatus for fabricating the radome of Figure 5 employing the pressure bag principle in the forming step.

It follows from the principle of the method employed with the apparatus described in connection with Figure 6 that, in lieu of the vacuum-bag mode of forming the assembled glasscloth components, a pressure bag 35 as shown in Figure 7 and of any of the suitable well-known forms now available on the market, may be disposed in facewise contact with the outer or concave face of the breather layer 28 and suitably connected to a pressure-fluid source, by a conduit 34 the previous polyvinyl chloride sheet 29 of course being omitted. The curing and forming steps are then performed concurrently, to these ends the pressure fluid being applied to expand the bag contemporaneously with the application of the heating medium through the conduits 15 at the proper curing temperature for the proper length of time. Thereafter, the temperature of the heating medium is elevated to a sufficient degree, and for a sufficient length of time, to melt out the wax composition from the wax filled tubes. The transversely ducted, "hollow-sheet" article is then removed from the mold ready for use as a heated radome or other ice-repellent, paradielectric enclosure.

The ducted glasscloth radome made by the process and apparatus diagrammatically illustrated in Figure 2 is completely shown in Figures 8 and 9 as consisting of a compound curved hollow wall 35 made up of a plurality of hollow tubes 36 for the heated medium, the tubes' axes extending transversely of the wall's vertical dimensions and being united at their ends on the one-half of the periphery of the rear edge of the radome to a manifold 37 which has an inlet 38 for entraining the hot medium thereinto. The tube-ends on the other half of the said periphery are united to a header 39 which has an outlet fitting 41 therein. The source of the heated medium is located aft in the airplane and is properly flow connected to the inlet and outlet fittings by a suitable conduit system, not shown.

In Figure 10, there is shown a complete radome made by the apparatus and process of Figure 3 and consisting of a tube-bundle like that made up of the tubes 36 of Figure 8 but faced on its exterior surface with a sheet of glasscloth 42 impregnated with resin.

In any form of the invention, the thickness of the surfaces defining the major faces, or outer boundaries, of the hollow wall of the radome, is maintained within certain predetermined limits. These limits are determined by effecting a compromise between the optimum strength-weight ratio thickness, the optimum thickness for thermal conductivity, and the optimum thickness for transmissibility of radiant electrical energy. In the form being fabricated in Figure 2, the thickness of the opposite outer faces of the laterally integrated hollow tubes, these faces being constituted by the laterally joined outer surfaces of the tubes, is of the order of .030 inch. In the forms shown being fabricated in Figures 3 and 4, the predetermined thickness of the facing sheets united facewise to the hollow tubes is preferably of such order that, combined with the thickness of the adjacent tubewall, the total thickness of the combination is also of the order of .030 inch.

Although there have been disclosed several of the particular processes contemplated by the invention, together with certain of the presently preferred apparatuses for fabricating them from such desirable materials as Fibreglas cloth or other glasscloth impregnated with a thermo-setting resin, as well as self-curing polyesters and alkyd-type resins with a peroxide catalyst, it should be now apparent that such descriptions have been provided solely in order to render the inventive concepts more concrete. The details of such descriptions, therefore, are not to be considered as limiting the scope of the invention except as required by the ambit of the sub-joined claims.

I claim:

1. A method of fabricating a receptacle defined by a thin, multi-ducted wall of heat transmitting material, comprising: forming a resin-impermeable meltable waxen material into lengths having a cross-section whose dimensions correspond to those in the ducts of the receptacle to be fabricated; impregnating sheets and narrow thin strips of fibrous material with a curable thermosetting resin capable of passing heat, the curing temperature of the resin being lower than the melting point of the meltable material; spirally wrapping the lengths of meltable material with the strips of fibrous material; conforming at least one sheet of the fibrous material to the shape of and within a mold having a surface of compound curvature defining the contours of the receptacle to be fabricated; placing a plurality of the spirally wrapped lengths of material in touching, side-by-side relationship on the sheet within the mold and conforming them to the shape of the mold; covering the exposed surfaces of the wrapped lengths of material with at least one sheet of impregnated material; applying a uniform pressure to the assembly and simultaneously subjecting said assembly to heat at the curing temperature of the resin for a period of sufficient duration to effect curing of the resin; heating the cured assembly to a degree at which the lengths of material melt; and flowing the melted material out of the assembly whereby a receptacle having ducted walls is formed.

2. A process for forming a multi-ducted shell comprising: spirally wrapping elongate rectangular rods of resin-impermeable waxen material with strips of thermosetting resin impregnated fibrous material; placing the wrapped rods in touching side-by-side relationship and between sheets of resin impregnated material; conforming the assembly to the shape of the shell to be fabricated; curing the assembly under pressure and heat; subjecting the assembly to a higher degree of heat at which the waxen material melts; and removing the melted waxen material.

3. A method of making internally ducted, generally hemispherical shells comprising: enveloping lengths of resin impermeable, meltable, rod-like waxen material by a helical wrapping of strips of thermosetting resin-impregnated fibrous material thereabout, the melting temperature of the meltable material being higher than the curing temperature of the resin; conforming a sheet of thermosetting resin impregnated fibrous material to the contour of the shell to be produced; placing a plurality of the wrapped lengths of meltable material in side-by-side relationship and conforming the lengths to the contour of the formed sheet of impregnated material; conforming a second resin impregnated sheet over the rod-like lengths whereby to sandwich the rod like lengths between the said sheets; subjecting the assembly to the curing heat of the resin; heating the assembly to the melting temperature of the meltable material; and removing the melted material from the assembly whereby a series of duct like voids are formed between the sheets of resin impregnated material.

4. A process for fabricating a multi-ducted, protective shell comprising: spirally wrapping elongate rectangular rods of meltable waxen material with strips of thermosetting resin impregnated material, the resin having a curing temperature below the melting point of the waxen material; conforming sheets of thermosetting resin impregnated material respectively to the contours of the inner and outer surfaces of the shell to be formed; placing the wrapped rods in parallel contiguous relationship between the sheets of resin impregnated material; curing the resin in the assembly under heat and pressure; removing the waxen rods by melting, whereby a plurality of internal ducts are formed having inlets and outlets; and joining the respective inlets and outlets by attaching manifolds thereto.

References Cited in the file of this patent

UNITED STATES PATENTS

| | | |
|---|---|---|
| 1,547,646 | Frederick | July 28, 1925 |
| 2,029,048 | Atwood | Jan. 28, 1936 |
| 2,315,394 | Brosius | Mar. 30, 1943 |
| 2,458,864 | Lindsay | Jan. 11, 1949 |
| 2,477,852 | Bacon | Aug. 2, 1949 |
| 2,478,165 | Collins | Aug. 2, 1949 |
| 2,519,036 | Ford et al. | Aug. 15, 1950 |
| 2,572,924 | Gonda | Oct. 30, 1951 |
| 2,593,714 | Robinson | Apr. 22, 1952 |